(12) United States Patent
White

(10) Patent No.: US 9,051,023 B2
(45) Date of Patent: Jun. 9, 2015

(54) AERODYNAMIC HANDLEBAR STORAGE CONTAINER

(75) Inventor: Philip White, Toronto (CA)

(73) Assignee: VROOMEN/WHITE DESIGN INC., Toronto (CA)

( * ) Notice: Subject to any disclaimer, the term of this patent is extended or adjusted under 35 U.S.C. 154(b) by 548 days.

(21) Appl. No.: 12/662,398

(22) Filed: Apr. 14, 2010

(65) Prior Publication Data

US 2010/0257973 A1    Oct. 14, 2010

Related U.S. Application Data

(60) Provisional application No. 61/202,866, filed on Apr. 14, 2009.

(51) Int. Cl.
*B62J 7/06* (2006.01)
*B62K 21/12* (2006.01)
*B62J 99/00* (2009.01)

(52) U.S. Cl.
CPC ........... *B62K 21/12* (2013.01); *Y10T 74/20822* (2015.01); *B62J 99/00* (2013.01)

(58) Field of Classification Search
CPC ...................... Y10T 74/20822; Y10T 74/2078
USPC .......... 224/420, 421, 412, 414, 418, 428, 433
See application file for complete search history.

(56) References Cited

U.S. PATENT DOCUMENTS

| 4,066,290 | A | * | 1/1978 | Wiegert et al. ............... 296/78.1 |
| 5,115,952 | A | | 5/1992 | Jenkins |
| 5,199,619 | A | | 4/1993 | Mostashari |
| 5,275,067 | A | * | 1/1994 | Lew ............................. 74/551.1 |
| 5,324,059 | A | * | 6/1994 | Bryne ........................... 280/283 |
| 5,803,328 | A | | 9/1998 | Nakahara |
| 6,357,708 | B1 | | 3/2002 | Carson |
| 2005/0121935 | A1 | * | 6/2005 | Bell ............................. 296/78.1 |
| 2007/0012740 | A1 | * | 1/2007 | Montgomery ................ 224/414 |

FOREIGN PATENT DOCUMENTS

| CA | 2511 348 | 1/2007 |
| DE | 29710923 U1 | 9/1997 |
| DE | 29819732 U1 | 3/1999 |
| EP | 1 886 911 | 2/2008 |
| GB | 2 224 253 A | 5/1990 |

* cited by examiner

*Primary Examiner* — Brian D Nash
*Assistant Examiner* — Corey Skurdal
(74) *Attorney, Agent, or Firm* — Riches McKenzie & Hebert LLP

(57) ABSTRACT

A bicycle comprising a frame, a front fork pivotably mounted to the frame, and handle bars coupled to the fork for pivoting with the fork, the handle bars including a pair of laterally spaced arm rests and a pair of laterally spaced extension hand grips, the extension hand grips provided forwardly of the arm rests such that a rider resting his forearms of his arms on the arm rests with his arms extending forwardly from the arm rests may grasp the extension hand grips with his hands, characterized by an aerodynamic element is provided mounted to the handle bars between the arm rests.

14 Claims, 9 Drawing Sheets

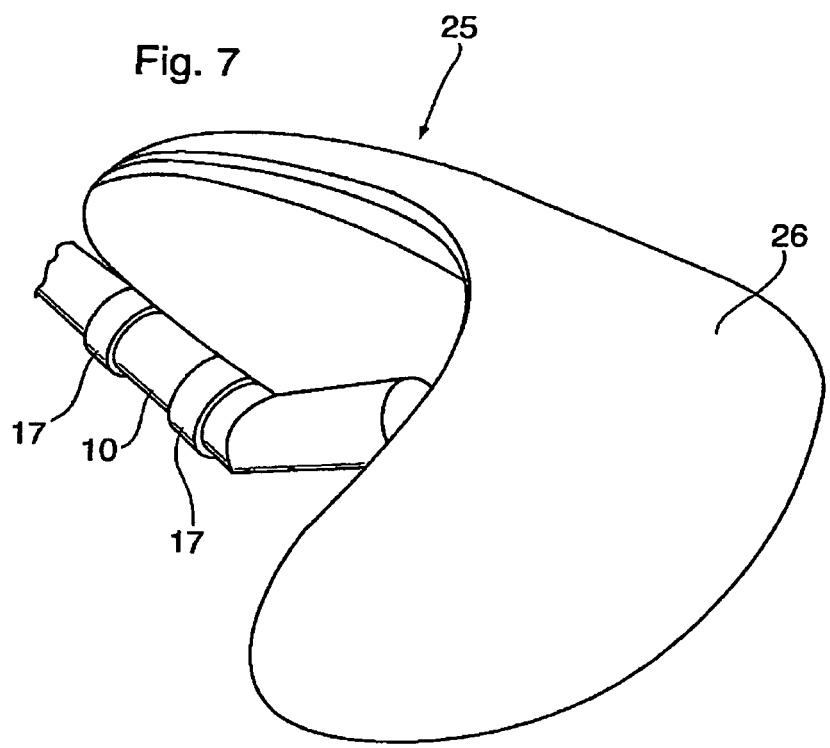

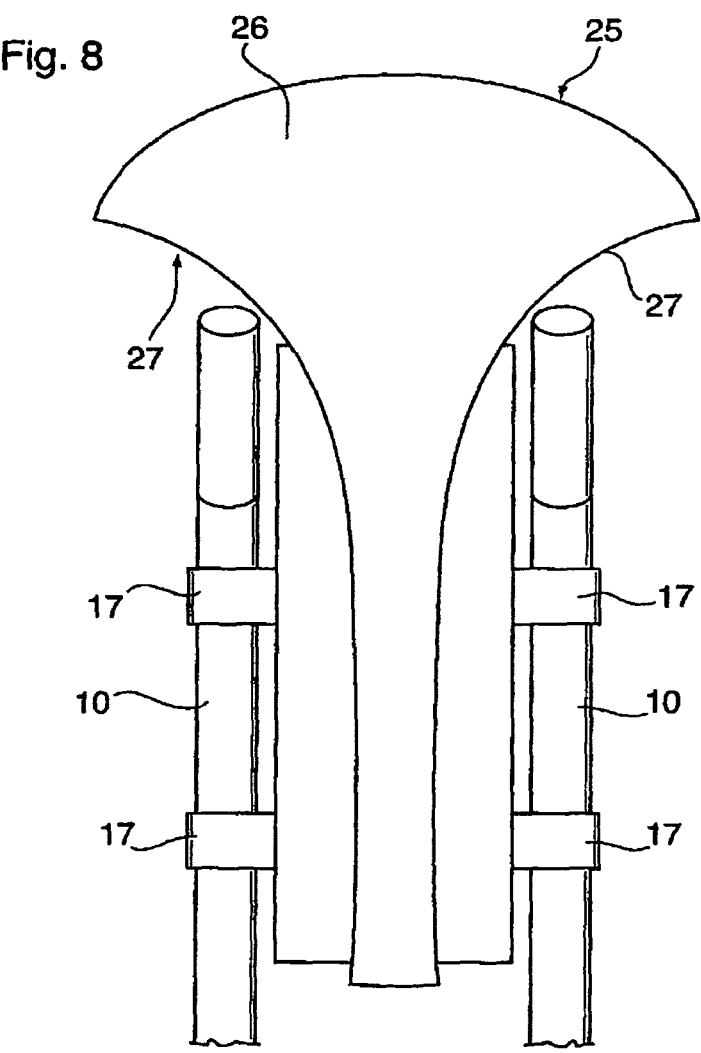

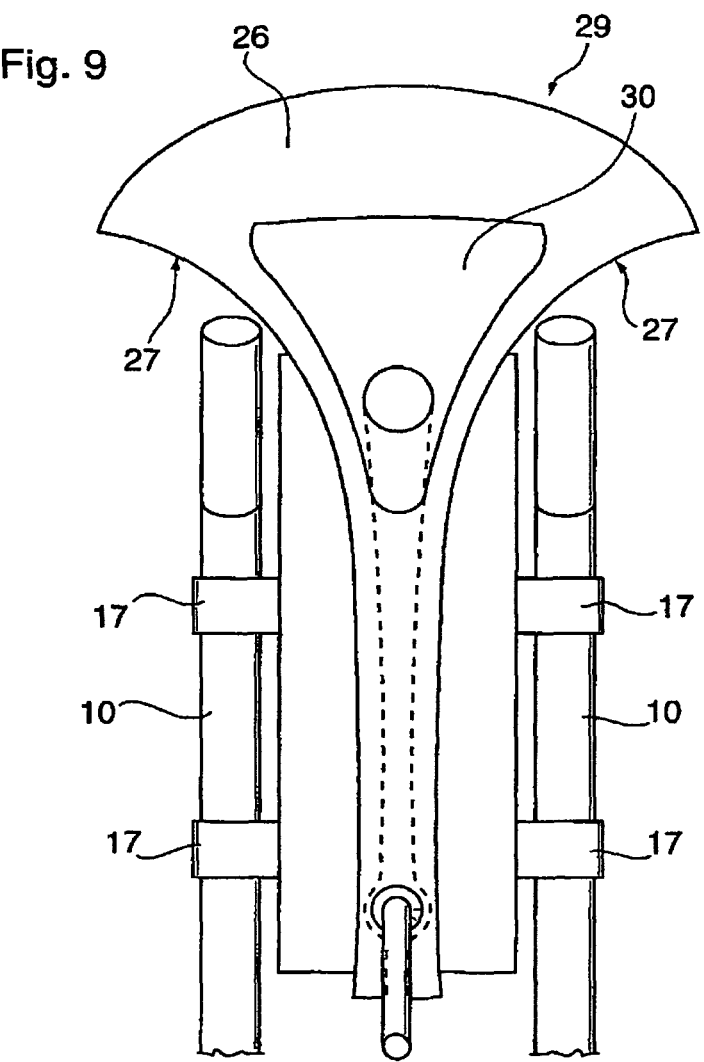

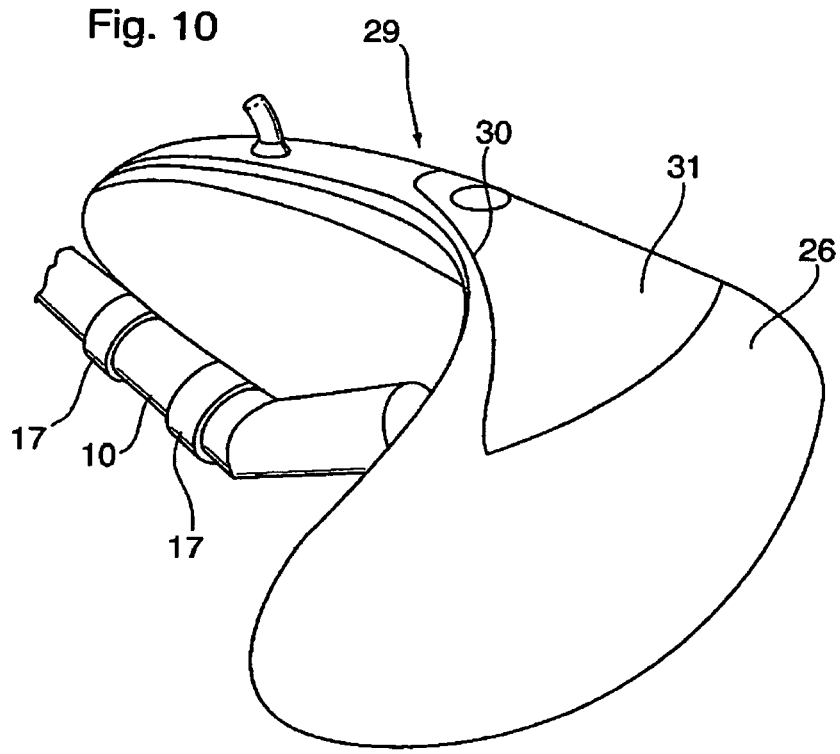

AERODYNAMIC HANDLEBAR STORAGE CONTAINER

RELATED APPLICATION

This application claims the benefit under 35 U.S.C. 119(e) to U.S. provisional patent application Ser. No. 61/202,866 filed Apr. 14, 2009.

FIELD OF THE INVENTION

The present invention relates to an aerodynamic element for attachment to the handlebars of a bicycle, and more particularly to an aerodynamic storage element.

BACKGROUND OF THE INVENTION

A typical bicycle water bottle is mounted in a carrier attached to the down tube or the seat tube of a bicycle frame. A typical tool containing pouch is mounted to a bicycle frame behind the rider's seat. The water bottle or tool pouch profile extends well outside the envelope of the bicycle frame, when viewed from the front, and thus has the disadvantage that each adds to the frontal area of the bicycle increasing the aerodynamic drag of the bicycle. Further, the shape of the tool pouch or water bottle has the disadvantage that they each typically disturb the air flowing across the bicycle frame members, thus further adding to the over all aerodynamic drag of the bicycle.

A further typical disadvantage with such a water bottle is that the location of the water bottle on the bicycle frame requires a rider to reach down to remove the bottle which movement by the rider increases aerodynamic drag and makes the bicycle less stable while the rider has only one hand remaining on the handlebars.

SUMMARY OF INVENTION

To at least partially overcome these disadvantages the present invention provides an aerodynamic element attached to the handlebars, and more particularly to an aerodynamic storage element.

One object of the invention is to provide an element for attachment to the handle bars to reduce aerodynamic drag. Another object is to provide an improved storage element with reduced aerodynamic drag.

In a first aspect, the element is attached to the handlebars of the bicycle and provides an aerodynamic shape. The aerodynamic shape of the element is selected to be the shape that assists in reducing the aerodynamic drag when the bicycle moves forwardly through the air. Preferably, this may be an oval shape. Furthermore, the oval shape may be a teardrop shape. A teardrop shape essentially has an enlarged rounded forward end and a reduced size at the rear end.

The element may also be designed including an enlarged front end allowing the rider's arms to be shielded from oncoming air flow. Thus in a second aspect, the element creates an aerodynamic shield at the front of the bicycle. In particular, when the element is attached to the handlebar of the bicycle, the body of the rider, and in particular the arms fit adjacent and/or behind the storage element creating an optimal aerodynamic form, effectively smoothing out the air flow across the handlebars and at least the rider's arms. The net result is a reduction in the aerodynamic drag on the bicycle and the rider. The exposed portions of the element form an aerodynamic shape with the rider, and at least the rider's arms, in an aerodynamic envelope. Preferably sides of the element adjacent a user's arms may closely engage inwardly directed surfaces of a user's arms.

The element is designed for the attachment to the handlebars in a variety of manners and in particular may be attached by clips or straps to the handlebars or handlebar extensions. The attachments for the element are also adjustable to the size and width of the handlebars and/or handlebar extensions.

The element is designed to be adjustable to fit a variety of handlebar arrangements. In particular, the element may be made in a hard shell with expandable sides. The expandable sides can be adjusted to increase in width to fit on wider sets of handlebars and to fit between the rider's arms when holding the extensions of the handlebars. The element may also be designed so that the combination of the rider's arms and the element form an aerodynamic shape to reduce air resistance.

The element preferably also serves the purpose of being a storage element. The storage element may also be designed with an opening, preferably, on the top of the storage element, to an interior storage compartment. The interior storage compartment can be adapted to store any manner of items, including, water, food, bicycle tools, collapsed inflatable bicycle tire replacement inner tubes, inner tubes inflation devices, eyeglasses, goggles, clothing, maps and other items. The interior storage compartment can be configured to be accessible to the rider of the bicycle while the rider is riding the bicycle. In particular, the interior storage compartment is placed on the handlebars for easy access for the rider.

The storage element may also be designed as a water bottle. A flexible bladder may be placed within the storage element to be filled with water or another suitable liquid. The storage element may include an opening to refill the bladder and an opening for a drinking straw arrangement. The refilling and drinking openings may be one or two openings. In the embodiment, the storage element is designed to be a refillable container such as water bottle for the storage of the fluids for consumption by the rider. The drinking straw may allow the rider to drink from the storage element without removing the storage element from the handlebars. The advantage to the drinking straw is that it allows the rider to drink, without breaking from the aerodynamic position of the bicycle, as necessitate by a removable water bottle. Furthermore, by placing the storage element on the handlebar of the bicycle, the storage element is very close to the mouth of the rider for easy use of a drinking straw.

The element may be adjustable to create a larger interior storage compartment. The element may also be made of a single fixed shell size.

A bladder may be provided inside the storage element for storage of fluids. The bladder may be designed to expand elastically or be a flexible bladder designed to fill the space of the interior storage compartment, which may be expandable.

The bladder and the storage compartment may be accessible through an opening in the storage container, which corresponds to an opening in the bladder. The opening may be a screw top, sphincter or any other suitable opening.

In a further aspect, the present invention provides a bicycle comprising a frame, a front fork pivotably mounted to the frame, and handle bars coupled to the fork for pivoting with the fork, the handle bars including a pair of laterally spaced arm rests and a pair of laterally spaced extension hand grips, the extension hand grips provided forwardly of the arm rests such that a rider resting his forearms of his arms on the arm rests with his arms extending forwardly from the arm rests may grasp the extension hand grips with his hands, characterized by an aerodynamic element is provided mounted to the handle bars between the arm rests.

Further aspects in the invention will become apparent upon reading the following description and drawings, which illustrate the invention and preferred embodiment of the invention.

BRIEF DESCRIPTION OF THE DRAWINGS

In the drawings, which illustrate embodiments of the invention:

FIG. 7 is a schematic perspective view of an element with an aerodynamic shroud in accordance with a second embodiment of the present invention, mounted on a handlebar system similar to that shown in FIG. 1;

FIG. 8 is a schematic top view of a storage element substantially the same as that of FIG. 7;

FIG. 9 is a schematic top view of the storage element of FIG. 8 with an aerodynamic shroud and a storage opening; and FIG. 10 is a schematic perspective view of the storage element of FIG. 9.

DETAILED DESCRIPTION OF THE DRAWINGS

Preferred embodiments and its invention and its advantages can be understood by referring to the present drawings. Through all of the drawings the same reference numbers will be used to refer to similar elements.

Figure 1:
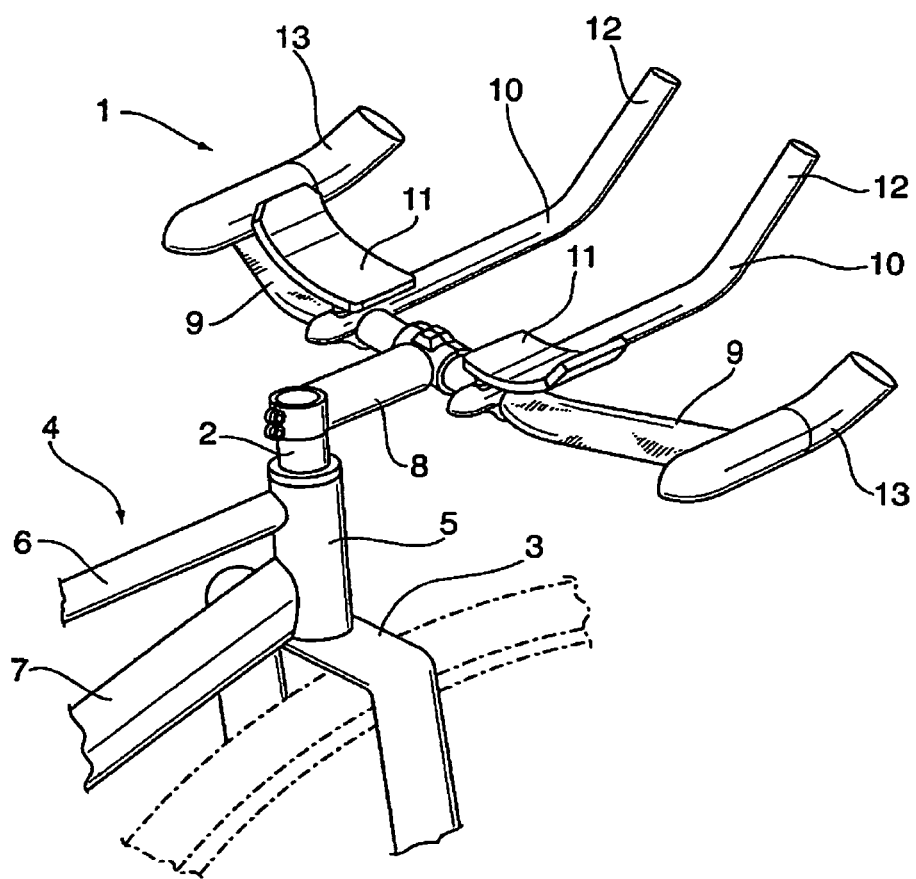
FIG. 1 is a schematic perspective view of a prior art bicycle handlebar system.

FIG. 1 illustrates a schematic perspective view of a prior art handlebar system 1 attached to a steer tube 2 of a bicycle front fork 3.

A bicycle frame 4 comprises a head tube 5, a top tube 6 and a down tube 7. The bicycle, when in normal use, moves in a forward direction where the head tube 5 is forward of the top tube 6 and down tube 7. The top tube 6 extends generally in a forward direction. Each of the top tube 6, head tube 5 and down tube 7 is a tubular member extending about their own along longitudinal axis. The longitudinal axis of each of the tubular members lies in a flat longitudinal central plane running through the longitudinal axis of each of the head tube 5, top tube 6 and down tube 7.

The handlebar 1 includes a stem 8, a base bar 9, extensions 10, armrests 11, base bar handgrips 12, and extension handgrips 13.

Figure 2:
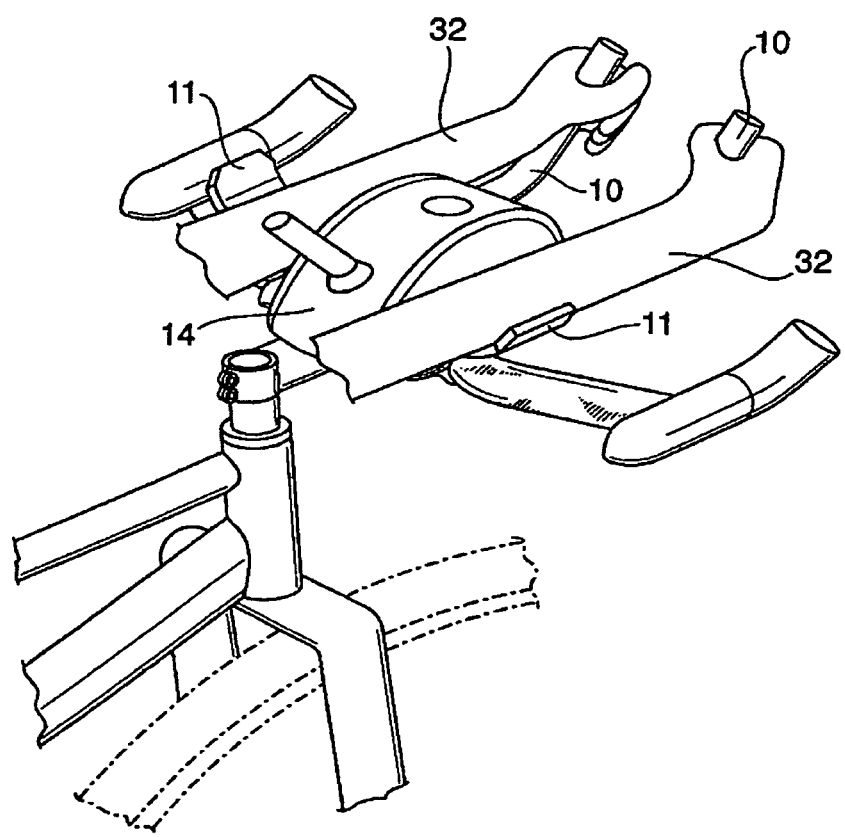
FIG. 2 is a schematic perspective view of the handlebar system of FIG. 1 showing a rider's arms and a storage element in accordance with a first embodiment of the present invention.

FIG. 2 is a schematic perspective view of the handlebar system 1 of FIG. 1 illustrating the rider's arms 32 resting on the arm rests 11 and holding the extensions hand grips 13. As seen in FIG. 2 a storage element 14 is fitted between the rider's arms 13 and is fastened to the extensions 10.

Figure 3:
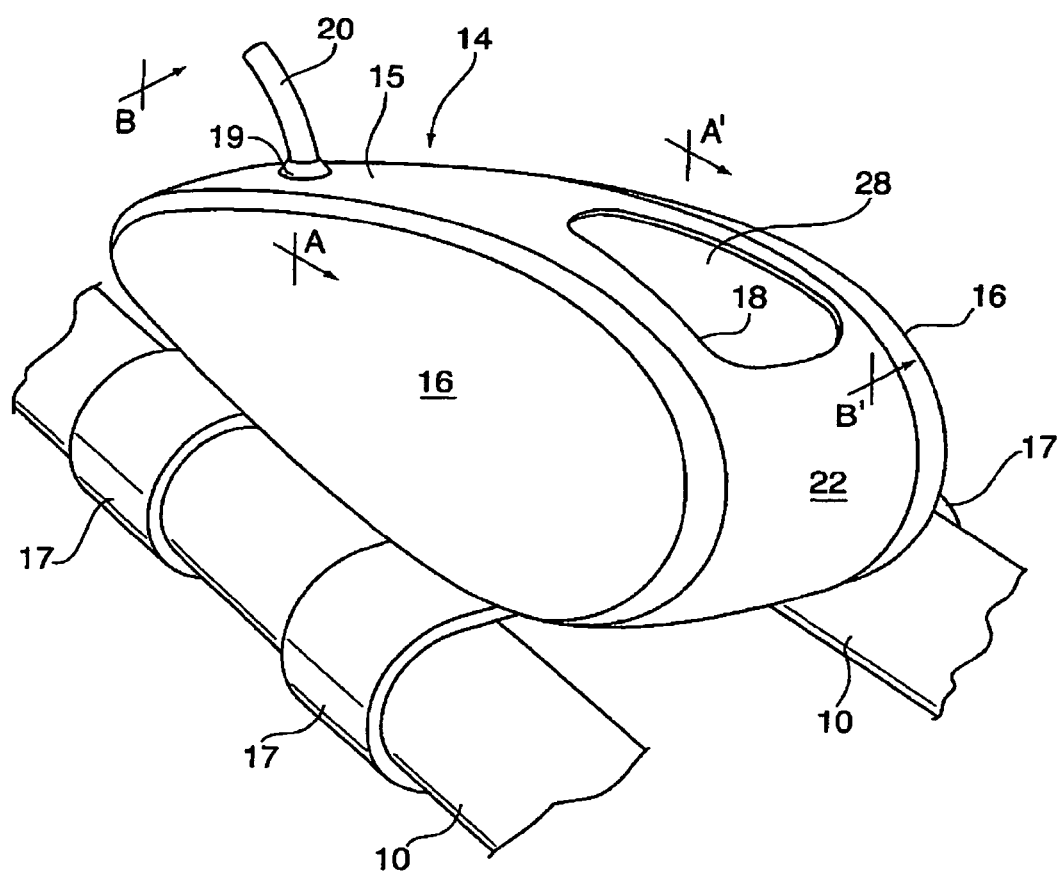
FIG. 3 is a schematic perspective view of the storage container of FIG. 2 attached to the handlebar system of FIGS. 1 and 2.

As seen in FIG. 3 the storage element 14 has a housing formed from a center portion 15 and two side portions 16. The storage element 14 is attached by straps 17 to the extensions 10 of the handlebar system 1. The location of the storage element may be adjusted along the extensions 10 to be secured closer or further away from the rider based on the rider's preference. Each of the center portion 15 and the side portions 16 of the housing may be formed for example from rigid plastic.

Figure 5:
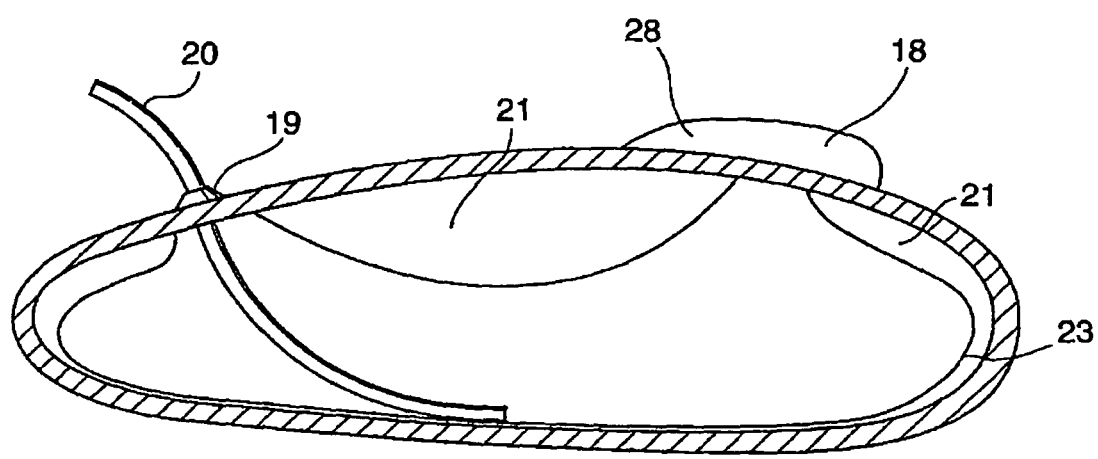
FIG. 5 is a schematic side cross-sectional view of the storage element of FIG. 3 along section line B-B' in FIG. 3.

As seen in FIG. 5, the storage element 14 has a rounded front portion 22 and a substantially aerodynamic oval or teardrop shape top to bottom with a rounded reduced size rear portion.

The storage element 14 in FIGS. 2 to 5 is adapted to carry water, and in this regard as seen in FIG. 5, preferably bladder 23 is provided inside the housing. The bladder 23 can be filled with water or other suitable liquids for drinking. The bladder 23 can be expandable to fit the size of the storage element interior 21. The bladder 23 may also be elastic to allow for expansion. The bladder 23 has a refill opening 18 and a drinking opening 19. A drinking straw 20 extends through the drinking opening 19, and presents an upper outer end directed towards the rider. A removable cap 28 closes the refill opening 18.

Figure 4:
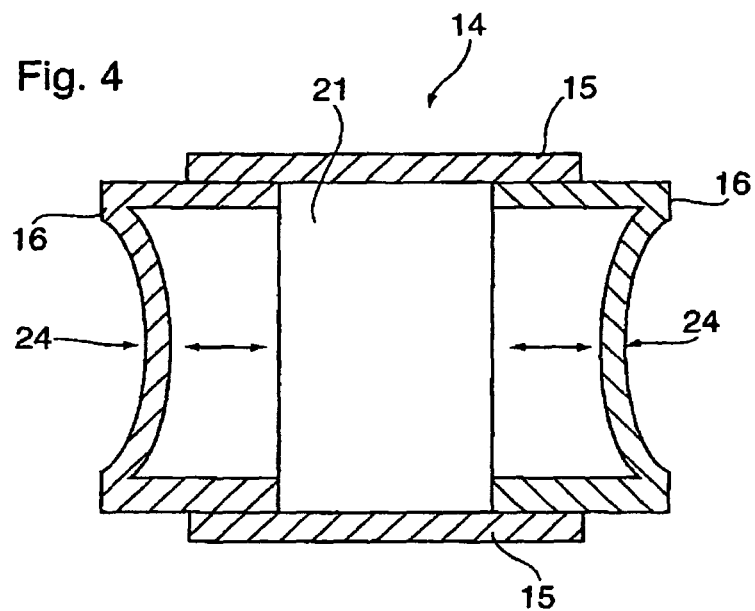
FIG. 4 is a schematic front cross-sectional view of the storage element of FIG. 3 along section line A-A' in FIG. 3.
Figure 6:
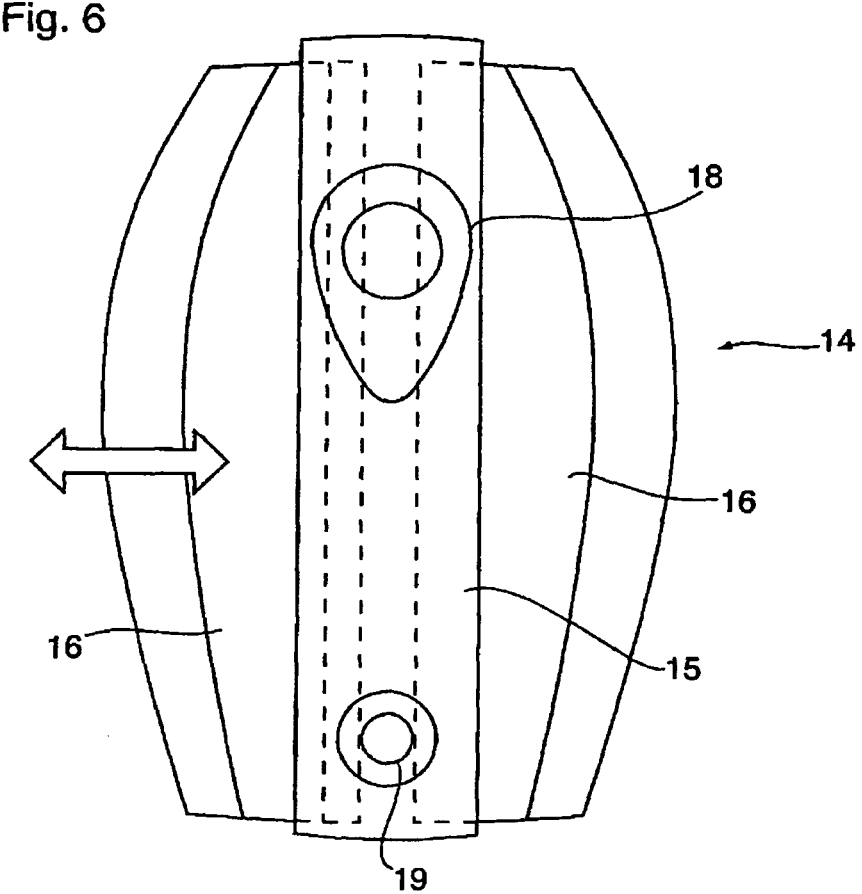
FIG. 6 is a schematic top view of the storage element of FIG. 2.

FIG. 4 is a schematic cross-section of the storage element 14 along section line A-A' in FIG. 3 showing that each side portions 16 is laterally slidable in the center portion 15 to adjust the width of the storage element 14. FIG. 6 also shows the two side portions 16 as laterally movable to increase the lateral dimensions of the storage element interior 21. The side portions 16 may be adjustably attached to the top portion 15 by any suitable means.

The side portions 16 have concave side surfaces 24 contoured such that the rider's arms fit into the concave side surfaces 24 with interior surfaces of each arm in close proximity to the concave side surfaces 24 as in engagement therewith as is believed advantageous to reduce drag. It is understood that while FIG. 4 illustrates the concave side surfaces 24 situated evenly between the top and bottom of the storage element side portions 16, the concave side surfaces 24 may be either higher or lower on the side portions 16 to correspond with the location of the rider's arms. The side surfaces 24 may be of a resilient, elastomeric material to deform to closely adapt to the shape of the rider's forearms when interior surfaces of the arms are urged into the side surfaces 24.

Reference is made to FIGS. 7 and 8 showing a second embodiment of an element 25 similar to the storage element 14 of FIGS. 2 to 6 but including an aerodynamic front shroud 26. The shroud 26 extends laterally to an extent that a rider's hands when gripping the extensions 10 are rearward of the shroud 26, and in particular in leeward cavities 27. The shroud 26 creates an aerodynamic envelope which is wider than the extensions 10 and substantially covers the rider's hands, which fit behind the shroud 26 in the leeward cavities 27. As seen top view in FIG. 8, the forward surface of the shroud 26 is ovalled side to side and as seen in FIG. 7, the forward surface is also ovalled top to bottom to provide for reduced drag.

Furthermore, as with the first embodiment, each of the side portions 16 is laterally slideable to adjust the width of the storage element.

Reference is made to FIGS. 9 and 10 showing a third embodiment in accordance with the present invention showing a storage element 29 similar to the element 25 in FIGS. 7 and 8 but including a drinking straw and a storage opening 30 carrying a refill opening 18. The storage opening 30 is larger than the refill opening 18 and is provided with a storage opening door 31 to seal the storage opening 30. The storage opening 30 permits the rider to place tools and other materials in the storage element interior 21 for storage.

In addition to the preferred embodiments outlined above, it is appreciated that the element may be a single piece. The single piece element may be designed with side portions that can be adjusted, for example by the use of flexible side materials. Alternatively, the single piece element may be designed without expandable side portions. Furthermore, the storage element may be designed with only one expandable side portion.

While the preferred embodiment is illustrated with a refill opening and a drinking opening, it is understood that the storage element may be designed with a single opening for drinking and refilling. Furthermore, the opening may be designed to allow the rider to use the storage element for purposes other than drinking such as a storage compartment for maps and food.

It is also envisioned that the storage element may incorporate hand grips and be secured directly to the base bar thereby replacing the extension arms.

While the invention has been described with reference to preferred embodiments, many modifications and variations will now occur to persons skilled in the art. For a definition of the invention, reference is made to the following claims.

I claim:

1. A bicycle comprising:
a frame, a front fork pivotably mounted to the frame, and handle bars coupled to the fork for pivoting with the fork,
the handle bars including a pair of laterally spaced arm rests and a pair of laterally spaced extension hand grips,
the extension hand grips provided forwardly of the arm rests such that a rider resting his forearms of his arms on the arm rests with his arms extending forwardly from the arm rests may grasp the extension hand grips with his hands,
characterized by an aerodynamic element is provided mounted to the handle bars between the arm rests wherein the aerodynamic element comprises a storage element and has a lateral side surface inward of a respective one of the arm rests facing respective one of the arm rests, each lateral side surface providing a forwardly extending channel to at least partially receive laterally inward portions of a reider's forearms when they are resting on the armrests,
wherein the storage element has an internal compartment adopted for the storage of items.

2. A bicycle as claimed in claim 1 wherein the aerodynamic element has a shape that assists in reducing aerodynamic drag when the bicycle is moved forwardly.

3. A bicycle as claimed in claim 2 wherein the shape is an oval shape.

4. A bicycle as claimed in claim 3 wherein the oval shape is a teardrop shape with an enlarged rounded forward end and a reduced size rear end.

5. A bicycle as claimed in claim 1 wherein the aerodynamic element extends forwardly between the extension hand grips to a front end between the extension hand grips.

6. A bicycle as claimed in claim 1 wherein the aerodynamic element extends forwardly between the extension hand grips to a front end which extends forwardly farther than the extension hand grips and with the front end extending laterally a greater extent than the extension hand grips so as to extend laterally in front of extension hand grips to shield the rider's hands grasping the extension hand grips from air flow.

7. A bicycle as claimed in claim 6 wherein the aerodynamic element has a shape that assists in reducing aerodynamic drag when the bicycle is moved forwardly.

8. A bicycle as claimed in claim 7 wherein the shape is an oval shape.

9. A bicycle as claimed in claim 8 wherein the oval shape is a teardrop shape with an enlarged rounded forward end and a reduced size rear end.

10. A bicycle as claimed in claim 1 wherein the combination of the rider's arms and the aerodynamic element forms an aerodynamic shape.

11. A bicycle as claimed in claim 4 wherein the combination of the rider's arms and the aerodynamic element forms an aerodynamic shape.

12. A bicycle as claimed in claim 9 wherein the combination of the rider's arms and the aerodynamic element forms an aerodynamic shape.

13. A bicycle as claimed in claim 1 wherein the internal compartment is configured to hold water.

14. A bicycle as claimed in claim 1 wherein the internal compartment is configured to hold tools, food, collapsed inflatable bicycle tire replacement inner tubes, inner tubes inflation devices, goggles, eyeglasses, clothing and maps.

* * * * *